United States Patent
Choi et al.

(10) Patent No.: US 9,587,724 B2
(45) Date of Patent: *Mar. 7, 2017

(54) SLIDING DEVICE FOR VEHICLE DOOR

(71) Applicants: HYUNDAI MOTOR COMPANY, Seoul (KR); KWANGJIN CO., LTD., Asan-si, Chungcheongnam-do (KR)

(72) Inventors: Jae Hong Choi, Hwaseong-si (KR); YoungBae Gong, Asan-si (KR)

(73) Assignees: Hyundai Motor Company, Seoul (KR); Kwangjin Co., Ltd., Asan-si, Chungcheongnam-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/812,765

(22) Filed: Jul. 29, 2015

(65) Prior Publication Data
US 2016/0130852 A1 May 12, 2016

(30) Foreign Application Priority Data
Nov. 6, 2014 (KR) ........................ 10-2014-0153528

(51) Int. Cl.
| | |
|---|---|
| *E05D 15/58* | (2006.01) |
| *F16H 19/04* | (2006.01) |
| *B60J 5/06* | (2006.01) |
| *B60J 5/04* | (2006.01) |
| *E05D 15/10* | (2006.01) |
| *E06B 3/50* | (2006.01) |
| *E05F 11/54* | (2006.01) |
| *E05F 15/638* | (2015.01) |

(52) U.S. Cl.
CPC .............. *F16H 19/04* (2013.01); *B60J 5/047* (2013.01); *B60J 5/06* (2013.01); *E05D 15/10* (2013.01); *E05D 15/58* (2013.01); *E05F 11/54* (2013.01); *E05F 15/638* (2015.01); *E06B 3/5072* (2013.01); *E05D 15/101* (2013.01); *E05Y 2201/684* (2013.01); *E05Y 2201/708* (2013.01); *E05Y 2201/72* (2013.01); *E05Y 2201/722* (2013.01); *E05Y 2900/531* (2013.01)

(58) Field of Classification Search
CPC ................................ B60J 5/0472; B60J 5/047
USPC .......................................................... 49/362
See application file for complete search history.

(56) References Cited

U.S. PATENT DOCUMENTS

| | | | | |
|---|---|---|---|---|
| 4,000,582 A | * | 1/1977 | Monot | ................ E05D 15/1044 49/218 |
| 4,268,996 A | * | 5/1981 | Allen | ......................... B60J 5/06 49/212 |

(Continued)

FOREIGN PATENT DOCUMENTS

| | | |
|---|---|---|
| JP | H11-334371 A | 12/1999 |
| JP | 2009-114773 A | 5/2009 |

(Continued)

*Primary Examiner* — Katherine Mitchell
*Assistant Examiner* — Marcus Menezes
(74) *Attorney, Agent, or Firm* — McDermott Will & Emery LLP

(57) ABSTRACT

A sliding device for a vehicle door includes a lower rail extending straightly and mounted on an exterior of a vehicle. A lower slider is coupled to the lower rail to move along the lower rail. A gear device is mounted on the lower slider to move with the lower slider. A linkage has one end connected to the gear device to transmit a torque and another end rotatably engaged with a lower portion of the vehicle door.

11 Claims, 4 Drawing Sheets

(56) References Cited

U.S. PATENT DOCUMENTS

| | | | | |
|---|---|---|---|---|
| 5,896,704 | A * | 4/1999 | Neag | E05D 15/1081 296/155 |
| 6,079,767 | A * | 6/2000 | Faubert | B60J 5/06 296/155 |
| 6,250,013 | B1 * | 6/2001 | Apprich | B60J 5/12 49/362 |
| 7,000,977 | B2 * | 2/2006 | Anders | E05D 15/48 296/146.12 |
| 7,144,068 | B2 * | 12/2006 | Oxley | B60J 5/06 296/155 |
| 7,810,282 | B2 * | 10/2010 | Oxley | E05F 15/638 49/358 |
| 8,893,436 | B2 * | 11/2014 | Choi | B60J 5/0468 296/155 |
| 2007/0049453 | A1 * | 3/2007 | Nagai | F16H 61/0295 475/254 |
| 2014/0026487 | A1 * | 1/2014 | Maruyama | B60J 5/047 49/176 |
| 2014/0173989 | A1 * | 6/2014 | Choi | E05F 15/06 49/350 |
| 2016/0123060 | A1 * | 5/2016 | Choi | E05D 15/58 49/254 |
| 2016/0129769 | A1 * | 5/2016 | Choi | B60J 5/0479 49/120 |

FOREIGN PATENT DOCUMENTS

| | | |
|---|---|---|
| KR | 10-1338781 B1 | 1/2014 |
| KR | 10-2014-0082278 A | 7/2014 |

* cited by examiner

SLIDING DEVICE FOR VEHICLE DOOR

CROSS-REFERENCE TO RELATED APPLICATION

This application claims the benefit of priority to Korean Patent Application No. 10-2014-0153528 filed in the Korean Intellectual Property Office on Nov. 6, 2014, the entire content of which is incorporated herein by reference.

TECHNICAL FIELD

The present disclosure relates to a sliding device for a vehicle door. More particularly, the present disclosure relates to a sliding device for a vehicle door enabling front and rear doors of the vehicle to be smoothly moved in a longitudinal direction of the vehicle with sliding.

BACKGROUND

A vehicle has a passenger room therein for passengers. Doors for opening and closing the passenger room are installed at the vehicle body.

In a passenger vehicle, doors for opening and closing the passenger room may have a front door disposed at the front in a longitudinal direction of the vehicle and a rear door disposed at the rear along the longitudinal direction of the vehicle. In general, the front door and the rear door are installed at the vehicle body to rotate via a hinge.

In a van, the doors for opening and closing the passenger room open and close the passenger room with sliding movement forward and reward along a longitudinal direction of the van.

The sliding door for opening and closing the passenger room of the van open the passenger room with moving rearward in the longitudinal direction of the van, and close the passenger room with moving forward along the longitudinal direction of the van. Thus, opening and closing of the sliding door requires a smaller space than a hinge type door, and sliding door can be fully open even in the small space.

However, the sliding door for opening and closing the passenger room need three supporting and guiding rails for supporting an upper portion, a middle portion, and a lower portion of the doors during opening and closing the doors, thereby increasing the number of parts and weight of the vehicle and depressing the design freedom of the vehicle.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a sliding device for a vehicle door having advantages of supporting a vehicle door to smoothly slide forward and rearward along a longitudinal direction of the vehicle.

A sliding device for a vehicle door according to an exemplary embodiment of the present inventive concept may include a lower rail extending straightly and mounted on an exterior of a vehicle. A lower slider is coupled to the lower rail to move along the lower rail. A gear device is mounted on the lower slider to move with the lower slider. A linkage has one end connected to the gear device to transmit a torque and another end rotatably engaged with a lower portion of the vehicle door.

The lower rail may include a rail body having a rectangular plate shape. Two guide rails extend in a longitudinal direction along both edges of the rail body in a width direction and protrude in a direction perpendicular to the rail body.

Each of the two guide rails may have a circular cross-section.

The lower slider may be provided in one pair at an upper portion and one pair at a lower portion. The one upper pair and the one lower pair of the lower slider may be mounted on a lower slider mounting bracket to integrally move.

The gear device may include a rack gear mounted at the lower rail, a gear shaft, and a planetary gear box which the gear shaft penetrates to be coupled thereto. An input gear is coupled to an upper portion of the gear shaft to integrally rotate, and an output gear is coupled to a lower portion of the gear shaft to integrally rotate and mesh with the rack gear. A transmission gear is meshed with the input gear, has an arc shape, and is mounted at the linkage.

The linkage may include a first link of which one end having a "U"-shaped cross-section engaged with the transmission gear. A second link has one end engaged with another end of the first link, and another end of the second link is engaged with a lower portion of the vehicle door.

Each of the first link and the second link may include an upper flange and a lower flange which have penetrating assembling hole, and a connecting flange which connects the upper flange with the lower flange. Each of the first link and the second link has a "U"-shaped cross-section.

The other end of the second link may be engaged with an engaging boss which protrudes at the lower edge of the vehicle door.

The engaging portion of the other end of the first link and the one end of the second link may be integrally engaged with a first drum. The engaging portion of the one end of the first link and the transmission gear is integrally engaged with a second drum. The first drum and the second drum may be connected with each other via a belt or a chain.

The first link has a third drum being rotatably supported, through which the belt or the chain passes.

The first drum may have a diameter smaller than that of the second drum.

The planetary gear box may increase an input rotational speed of input gear up to 8 to 12 times to output to the output gear.

The sliding device for a vehicle door according to the exemplary embodiment of the present inventive concept supports vehicle doors to smoothly pivot toward outside along a width direction of the vehicle.

Further, the sliding device of the present disclosure can smoothly move the vehicle doors forward and rearward along a longitudinal direction of the vehicle with sliding movement while being stably supported by the vehicle body after the pivot movement of the vehicle doors is completed.

Accordingly, it is possible to reduce the number of parts, weight and cost of the vehicle, improve the design freedoms, and prevent deterioration of exterior aesthetic of the vehicle.

In addition, since the vehicle doors can smoothly slidably move after stably rotating toward the outside along the width direction of the vehicle by a predeterminate angle, the vehicle doors can be softly, smoothly, and stably open and closed.

DETAILED DESCRIPTION OF THE EMBODIMENTS

Figure 1:
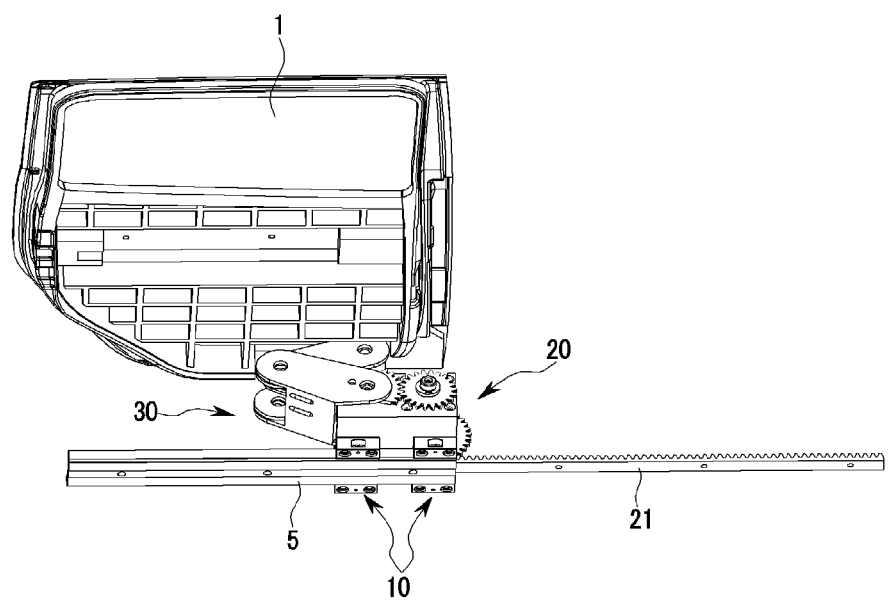
FIG. 1 is a combined perspective view of a sliding device for a vehicle door according to an exemplary embodiment of the present inventive concept.
Figure 2:
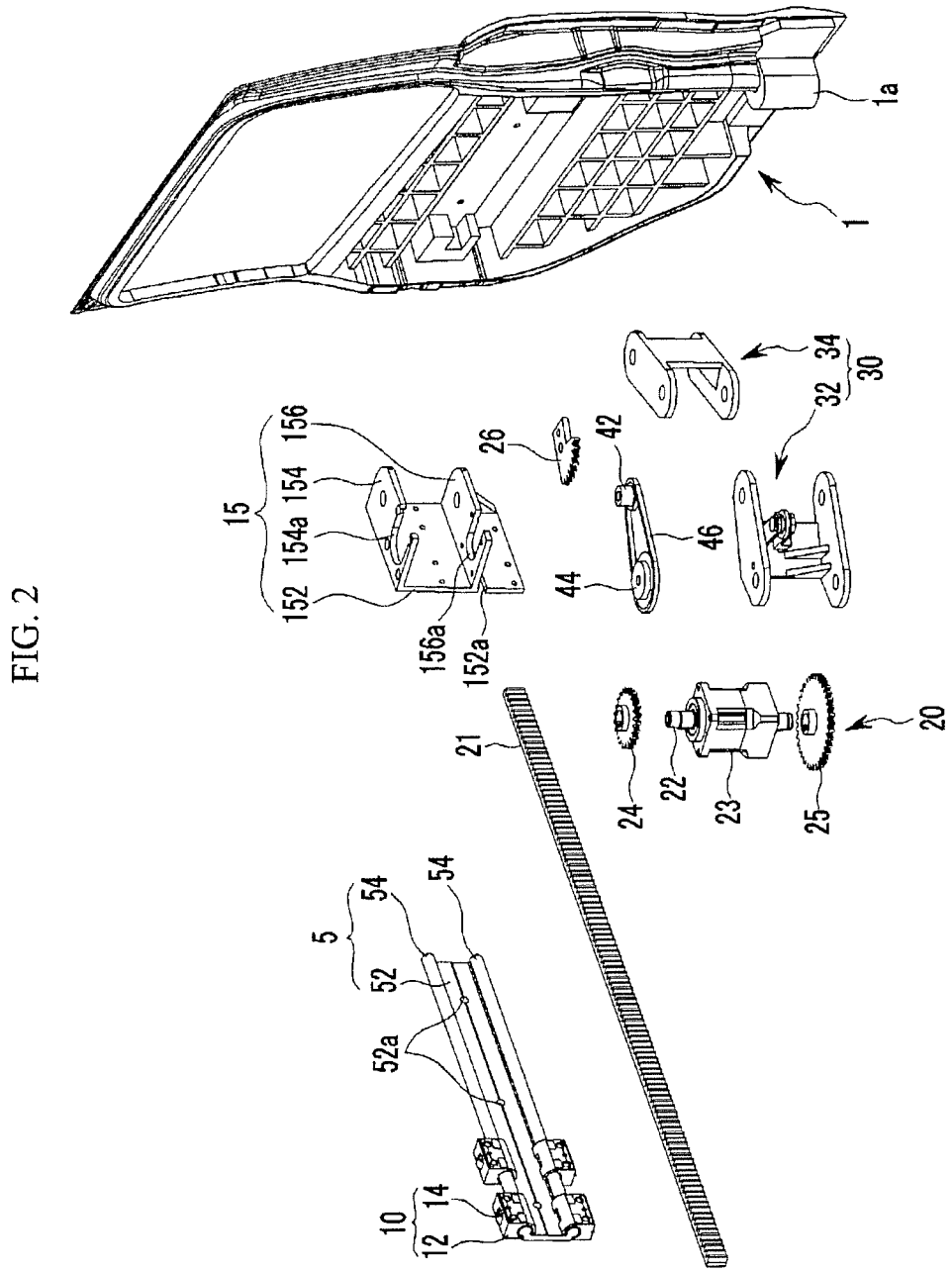
FIG. 2 is an exploded perspective view of FIG. 1.
Figure 3:
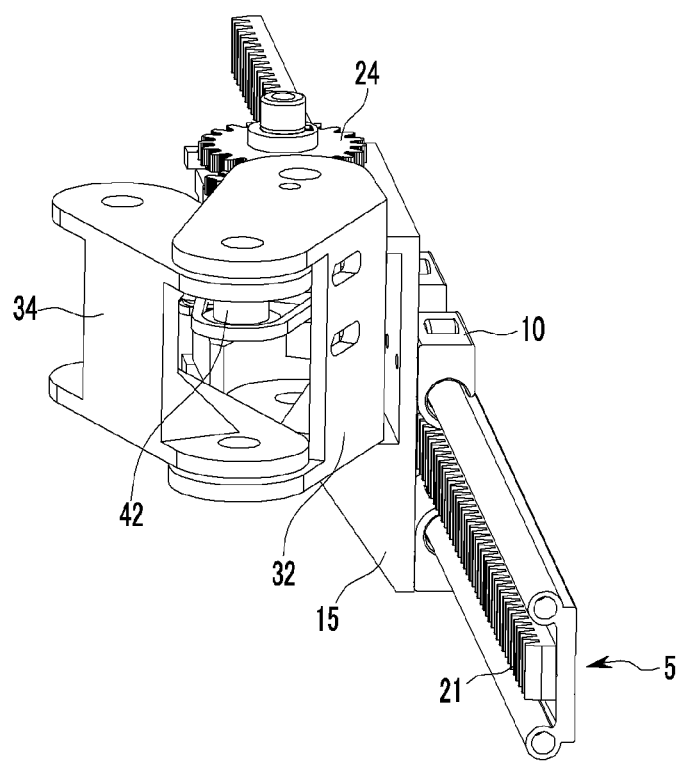
FIG. 3 is a combined perspective view of a sliding device for a vehicle door according to an exemplary embodiment of the present inventive concept.
Figure 4:
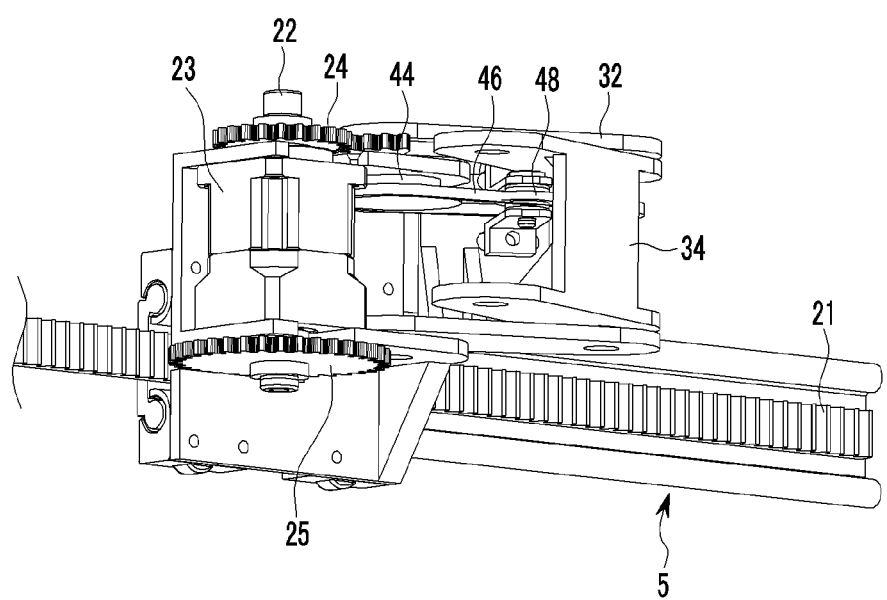
FIG. 4 is a partial perspective view.

Hereinafter, an exemplary embodiment of the present inventive concept will be in detail described with reference to the accompanying drawings.

Referring to FIGS. 1 to 4, a sliding device for a vehicle door according to an exemplary embodiment of the present inventive concept may support a vehicle door 1 for opening and closing by rotating and slidably moving forward and rearward along a longitudinal direction of the vehicle.

A vehicle body has a lower rail 5 extending forward and rearward along the longitudinal direction of the vehicle. Thus, the sliding device for the vehicle allows a lower portion of the vehicle door 1 to rotate with respect to the vehicle body and to move forward and rearward move along the lower rail 5.

The sliding device for the vehicle may include a lower slider 10 coupled to the lower rail 5 to move along the lower rail 5. A gear device 20 is mounted to the lower slider 10 to move together. A linkage 30 has one end connected to the gear device 20 in order to transmit torque and another end engaged with the lower portion of the vehicle door 1 to relatively rotate.

The lower rail 5 may include a rail body 52 having a rectangular plate shape, and two guide rails 54 extending in the longitudinal direction along both edges of the rail body 52 in a width direction and protruding in a direction perpendicular to the rail body 52.

Each of the two guide rails 54 may have a circular cross-section.

The rail body 52 may have a plurality of penetrating mounting holes 52a spaced apart in the longitudinal direction.

The mounting holes 52a may be formed for assembling the lower rail 5 to the vehicle body via bolts and so on.

The lower slider 10 may be one pair at an upper portion and one pair at a lower portion, and the one upper pair and the one lower pair of the lower slider 10 may be mounted on the lower slider mounting bracket 15 to integrally move.

The lower slider 10 may have a rectangular block shape and engaged with a guide rail 54 of the lower rail 5 such that the guide rail 54 is inserted into the lower slider 10. The lower slider 30 may include a slider body 12 with an assembling hole for coupling the lower slider mounting bracket 15. Rollers 14 are rotatably installed to the slider body 12, such that the rollers 14 are inserted into the slider body 12 and roll along the guide rail 54 while surface-contacting the guide rail 54 of the lower rail 5.

The lower slider mounting bracket 15 may include a bracket body 152 which the lower slider 10 is engaged with and supported by. An upper flange 154 and a lower flange 156 are integrally formed with the bracket body 152 and extend in a direction vertical to the bracket body 152.

Each of the upper flange 154 and the lower flange 156 may have penetrating mounting holes 154a, 156a and a long hole 152a at the bracket body 152.

The gear device 20 may include a rack gear 21 formed along the lower rail 5 and fixedly mounted at the lower rail 5; a gear shaft 22; a planetary gear box 23 which the gear shaft 22 penetrates to be coupled to; an input gear 24 coupled to an upper portion of the gear shaft 22 to integrally rotate; an output gear 25 coupled to a lower portion of the gear shaft 22 to integrally rotate and mesh with the rack gear 21; and a transmission gear 26 meshed with the input gear 24, having an arc shape, and mounted at the linkage 30.

The planetary gear box 23 has a planetary gear therein.

The planetary gear box 23 may increase an input rotational speed of input gear 24 up to 8 to 12 times to output to the output gear 25.

The linkage 30 may include a first link 32 of which one end having "U"-shaped cross-section is engaged with the transmission gear 26. A second link 34 has one end engaged with another end of the first link 32, and another end of the second link 34 is engaged with a lower portion of the door 1.

Each of the first link 32 and the second link 34 may include an upper flange and a lower flange with a penetrating assembling hole, and a connecting flange connecting the upper flange with the lower flange, thereby forming a substantially "U"-shaped cross-section.

An engaging boss 1a, with which the other end of the second link 34 is engaged, may be integrally formed at the lower edge of the door 1 to protrude.

The engaging portion of the other end of the first link 32 and the one end of the second link 34 may be integrally engaged with a first drum 42.

The engaging portion of the one end of the first link 32 and the transmission gear 26 may be integrally engaged with a second drum 44.

The first drum 42 and the second drum 44 may be connected with each other via belt 46 or a chain.

A third drum 48, through which the belt 46 or the chain passes, may be installed at the first link 32 to be rotatably supported.

The first drum 42 has a smaller diameter than that of the second drum 44 so that when the second drum 44 rotates 360 degrees, the first drum 42 may not rotate as much as 360 degrees.

FIG. 1 shows a state that the vehicle sliding door 1 is closed to be sealed.

When a user catches and pulls a door handle to release a door latch, the door 1 moves toward outside in a width direction of the vehicle. If the door 1 is pulled toward the outside in the width direction of the vehicle by the user, the second link 34 rotates thus rotating the first link 32 and the first drum 42. The rotation of the second drum 42 rotates the input gear 24 through the transmission gear 26, and the rotation of the input gear 24 rotates the output gear 25 with increased revolutions through the gear shaft 22 and the planetary gear box 23. Thus, the output gear 25 moves along the rack gear 21 while being engaged with the rack gear 21. The lower slider 10 moves along the lower rail 5 while being coupled to the lower rail 5, thereby rotating the door 1 outwards in the width direction of the vehicle.

When the rotation of door 1 toward the outside is completed, if the user pushes or pulls the door 1 forward in the longitudinal direction of the vehicle (backwards in the longitudinal direction of the vehicle in case of a rear door), the lower slider 10 moves along the lower rail 5, such that the door 1 slides forward in the longitudinal direction of the vehicle to fully open.

The fully opened state of the door 1 can be maintained by the door latch. When the door latch is released by the user, the door 1 slides to close and seal the door 1 (backwards in a longitudinal direction of the vehicle in case of a rear door).

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A sliding device for a vehicle door, comprising:
   a sliding door rail extending straightly and mounted on an exterior of a vehicle;
   a rail slider coupled to the sliding door rail to slide along the sliding door rail;
   a gear device mounted on the rail slider to move with the rail slider; and
   a linkage of which one end is connected to the gear device to transmit a torque from the gear device to the vehicle door, and another end is rotatably engaged with the vehicle door,
   wherein the linkage comprises: a first link of which a first end has a "U"-shaped cross-section engaged with a transmission gear; and a second link of which a first end is engaged with a second end of the first link and a second end of the second link engaged with the vehicle door,
   wherein an engaging portion of the second end of the first link and the first end of the second link is integrally engaged with a first drum,
   wherein an engaging portion of the first end of the first link and the transmission gear is integrally engaged with a second drum, and
   wherein the first drum and the second drum are connected with each other via a belt or a chain.

2. The sliding device of claim 1, wherein the sliding door rail comprises:
   a rail body having a rectangular plate shape; and
   two guide rails extending in a longitudinal direction of the vehicle along upper and lower edges of the rail body in a width direction and protruding in a direction perpendicular to the rail body.

3. The sliding device of claim 2, wherein each of the two guide rails has a circular cross-section.

4. The sliding device of claim 1, wherein the rail slider includes a first pair of rollers coupled to an upper portion of the sliding door rail and a second pair of rollers coupled to a lower portion of the sliding door rail, and the first and second pairs are mounted on a rail slider mounting bracket.

5. The sliding device of claim 4, wherein the rail slider mounting bracket includes a bracket body with which the rail slider is engaged and having an upper flange and a lower flange which are integrally formed therewith and extend in a direction perpendicular to the bracket body, and
   wherein each of the upper flange and the lower flange has a mounting hole, and the bracket body has a hole.

6. The sliding device of claim 1, wherein the gear device comprises:
   a rack gear mounted on the sliding door rail;
   a gear shaft;
   a planetary gear box through and to which the gear shaft penetrates and is coupled to;
   an input gear coupled to an upper portion of the gear shaft to integrally rotate with the gear shaft;
   an output gear coupled to a lower portion of the gear shaft to integrally rotate with the gear shaft and mesh with the rack gear; and
   the transmission gear meshed with the input gear, formed with an arc shape, and mounted on the linkage.

7. The sliding device of claim 6, wherein the planetary gear box increases an input rotational speed of the input gear up to 8 to 12 times to output to the output gear.

8. The sliding device of claim 1, wherein each of the first link and the second link comprises: an upper flange and a lower flange with a penetrating assembling hole; and a connecting flange connecting the upper flange with the lower flange so that each of the first link and the second link has a "U"-shaped cross-section.

9. The sliding device of claim 8, wherein the second end of the second link is engaged with an engaging boss which protrudes at a bottom edge of the vehicle door.

10. The sliding device of claim 1, wherein the first link has a third drum rotatably supported and through which the belt or the chain passes.

11. The sliding device of claim 1, wherein the first drum has a diameter smaller than a diameter of the second drum.

* * * * *